Aug. 30, 1960  D. S. SHERARD  2,950,861
INDICATOR DIAL COUNTER COMPUTER FOR GAS, LIGHT AND WATER METERS
Filed May 21, 1954  2 Sheets-Sheet 2
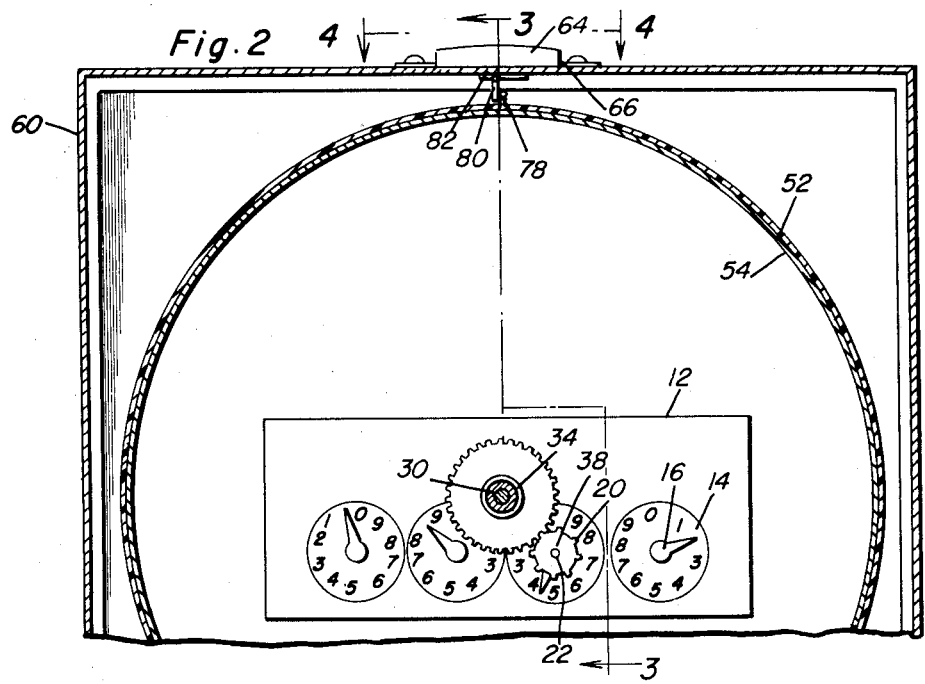
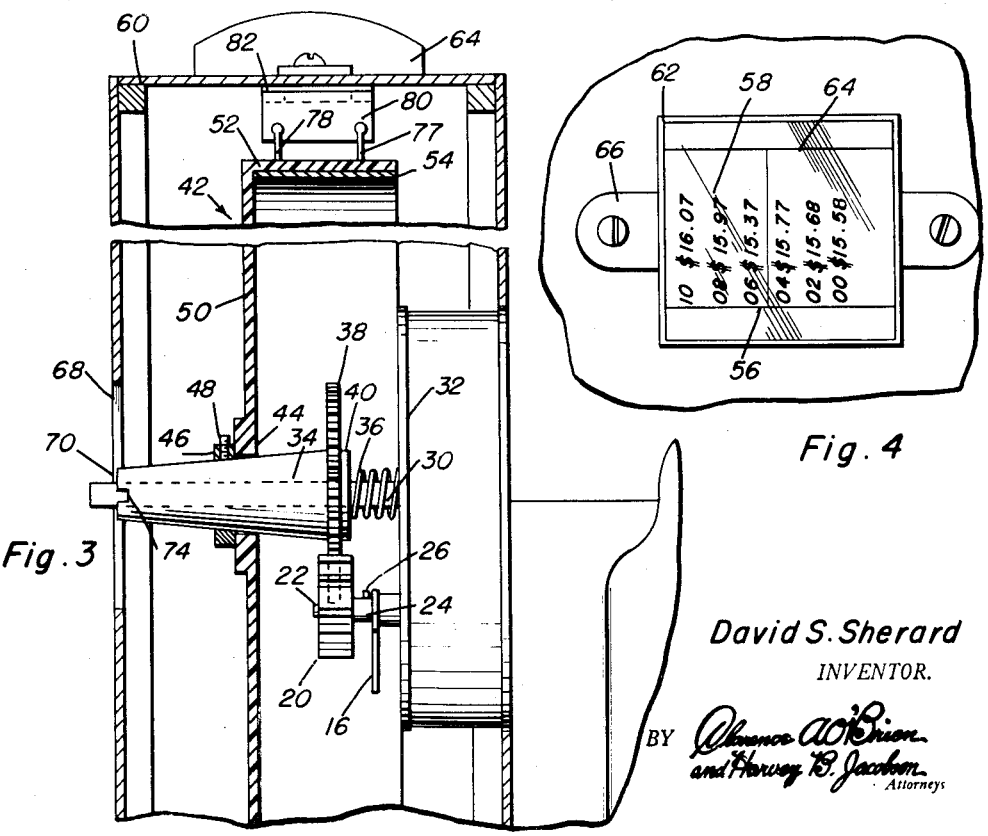
David S. Sherard
INVENTOR.

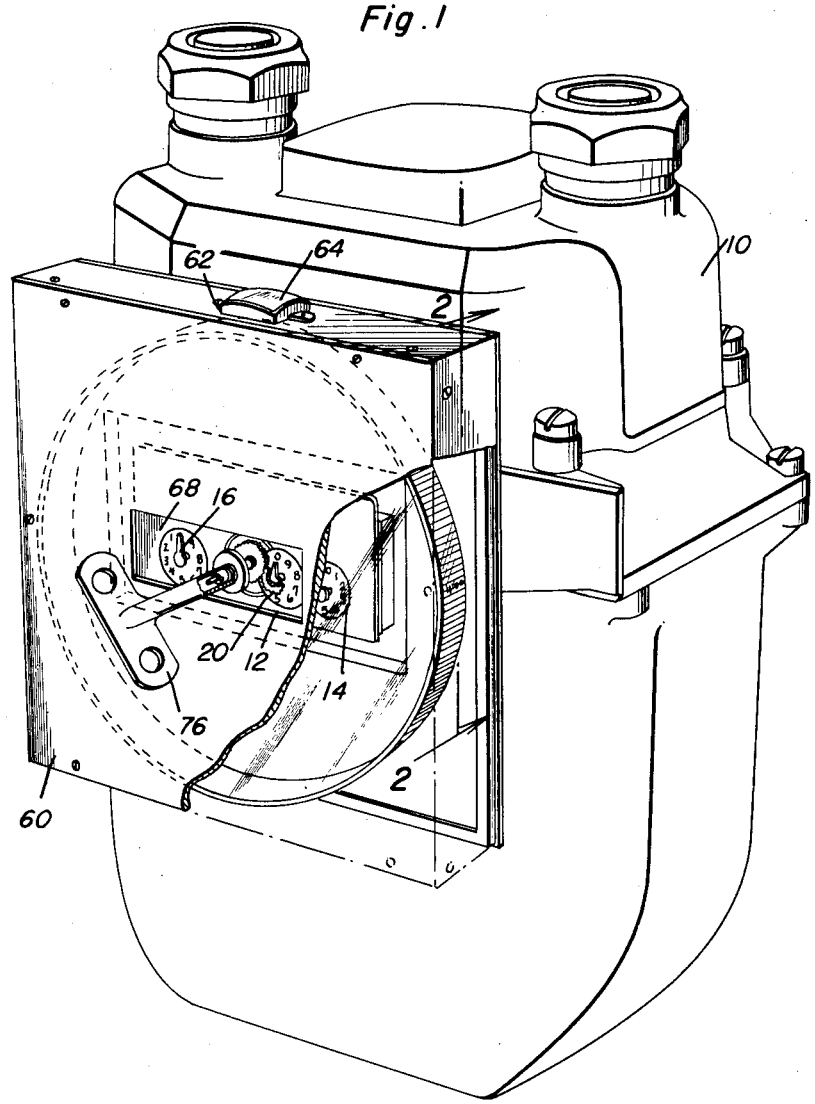

2,950,861

INDICATOR DIAL COUNTER COMPUTER FOR GAS, LIGHT AND WATER METERS

David S. Sherard, 2787 Emerald Drive., Jackson, Miss.

Filed May 21, 1954, Ser. No. 431,321

1 Claim. (Cl. 235—94)

This invention relates to a computing meter, and particularly to a computing device to be mounted on a standard meter, such as water, electric or gas meters, to compute the reading into a dollars and cents value.

In the utilization of service meters, such as water and gas meters, it is customary for the meter reader to periodically read the meter and to return this reading to a central office where the previous meter reading is subtracted therefrom to obtain the consumption over the period, after which the quantity is converted by means of a multiplication factor into a dollars and cents charge. After the charge has been computed, it is necessary to send the bill to the customer in order to appraise the customer of the amount to be paid.

The present invention relates to a computing device which may be placed on the usual meter device without in any way disturbing the operation or function thereof and which the meter reader can utilize to determine the exact dollars and cents over a preselected period. Also, it is so arranged that the customer can also read the meter reading to verify the statements made by the meter reader.

In the utilization of a device such as this, the meter reader will be provided with a special three-part billing form.

In a construction according to the invention, a driving gear is mounted on a rotating portion of the meter, such as the shaft driving one of the usual meter pointers, and an axle or spindle is mounted on the meter and carries a rotatable and slidable sleeve which has a gear meshed with the driving gear. A drum is mounted on the sleeve and indicia is provided on the periphery of the drum, usually the indicia being not only in consumption but in the actual cost thereof so that the meter reader may carry a preformed bill, a portion of which will be filled out and left with the customer, after which the meter reader will turn the meter to zero to again compute over a predetermined period until the meter reader again returns.

It is accordingly an object of the invention to provide a computing meter device.

It is a further object of the invention to provide a computing attachment which may be readily mounted on a standard meter.

It is a further object of the invention to provide a computing device by which the cost of the commodity sold may be immediately indicated.

It is a further object to provide a computing device which may be reset to zero after each reading.

Other objects and many of the attendant advantages of the present invention will be apparent from the following detailed description taken in conjunction with the accompanying drawing in which:

Figure 1 is a perspective view of a standard gas meter with the computing attachment according to the present invention applied thereto;

Figure 2 is a sectional elevation of the device taken substantially on the plane indicated by the section line 2—2 of Figure 1 and showing the driving construction of the device;

Figure 3 is a cross-section through the device taken substantially on the plane indicated by the section line 3—3 of Figure 2 showing the construction and mounting of the device on the meter; and Figure 4 is a top plan view of a portion of the device showing the window for observing a portion of the drum and the utilization of a magnifying device therein.

In an exemplification according to the invention, a standard meter 10 is provided with the normal meter face 12 having a plurality of meter devices herein shown as fixed dials 14 and rotating pointers 16. As is well known, the devices are fixed so that each successive pointer will move up one step after the previous pointer has moved up ten steps. For example, if the first dial 14 is in feet so that it represents 100 feet, then the next dial will step up one time for each thousand feet so that it will be reading in thousands of feet, and so on up. This is a standard construction of meter and is in no wise a portion of the present invention.

The present invention relates to a computing attachment to be mounted on the above noted standard meter. In a construction according to the present invention, a driving gear 20 will be mounted on a shaft 22 on which is mounted the pointer 16 for the second dial 14. It will be apparent that the shaft 22 will rotate in proportion to the amount of material metered by the meter so that the gear 20 will be rotated in proportion to the amount of material measured by the meter. The gear 20 will be connected by means of a collar 24 and a setscrew 26 so that there will be no interference with the construction and operation of the original meter.

An axle or spindle 30 is fixed onto the dial 32 of the meter in any suitable manner but in a way so that it will in no wise interfere with the operation of the normal dial pointers and such. A sleeve 34 is rotatably and slidably mounted on the axle 30, and a suitable stop is provided for preventing excessive forward motion of the sleeve 34 on the shaft 30, and a spring 36 is provided between the sleeve 34 and the dial 32 to resiliently urge the sleeve outwardly on the axle 30. A gear 38 is fixed on the sleeve 34 and when the sleeve 34 is in outward position, the gear 38 is in mesh with the driving gear 20.

Usually a washer 40 is provided between the top of the spring 36 and the sleeve 34 to reduce the friction therebetween. A drum member indicated generally at 42 is mounted on the sleeve 34 by means of a hub 44 and a retaining collar 46 secured to the sleeve 34 by means of a setscrew 48. The drum is mounted on a substantially transparent disk 50 and has a substantially cylindrical rim portion 52 to which an indicia bearing portion 54 may be attached by any suitable means. Preferably, the indicia member 54 is a paper strip glued, cemented or otherwise secured to the interior of the transparent cylinder-like portion 52 so it may be readily observed therethrough, although it is apparent that the paper strip could be pasted on the outside of a non-transparent cylinder portion. Preferably the portion 54 is provided with indicia, such as the meter readings 56 and the computed charge readings 58.

For protective purposes, the drum 42 as well as the sleeve 34 and the driving members therefor are enclosed in a suitable housing 60 which will be provided with an opening or window 62 through which the portion of the drum 42 may be observed, and preferably a magniflying device, such as a magnifying glass 64 will be mounted in the opening 62 by means of a frame 66. Preferably, the housing 60 is provided with a window 68 having a transparent material therein so that the normal dials of the standard meter may be observed by the meter reader to check the operation of the computing device or to see if the same has been properly set.

A keyhole 70 will be provided in the transparent face 68 so that a suitable key may be introduced through the keyhole into engagement with the end of the sleeve 34. Any suitable key having any desired arrangement thereon may be utilized so that when the key is engaged with the end of the sleeve 34, it will engage with suitable ratchet notches 74 therein so that the key 76 may be utilized to depress the sleeve 34 until the spring 36 is contracted sufficiently to disengage the gear 38 from the drive gear 20, after which the key may be turned to rotate the drum to any preselected setting. After the drum has been turned to its preselected setting, the pressure will be withdrawn so that the gear 38 will again mesh with the gear 20 to propel the drum in the normal manner. In order to provide a zero setting of the device, a stop member, such as the pins 77 and 78 are fixed in the periphery of the drum 42 and extend radially therefrom and a pivoted stop member 80 is mounted on the casing 60 by means of a hinge 82. The hinge member 82 is readily movable in one direction so that if the drum makes a complete rotation, the pins 77 and 78 may readily raise the device and pass thereunder without disturbing the operation of the meter, but when the drum is moved in a reverse direction, the pins will engage the member 80 and be stopped thereby so that the drum may be readily reset to a zero position. Indicating devices or counters may be provided to indicate if the counter has made a complete revolution and if so, the number of such complete revolutions. The meter could thus be operative to record unusual consumption or a reading over a long period between meter readings.

In connection and operation of the device according to the invention, the axle member 30 will be mounted on the face of the meter in any desired manner and the drive gear 20 will be attached by means of the setscrew 26 preferably to the second pointer element of the usual meter device. For simplicity of description and illustration, the driving connection between the post 22 and the sleeve 34 is described as intermeshing gearing, although it is apparent that other driving connections, such as friction discs or the like could be utilized. After the device has been installed on the meter, the sleeve 34 will be depressed to disengage the gear 38 from the gear 20 and the device will be set at zero reading or at some preselected reading, whatever it may be. When the meter reader comes to the device, he will be prepared with a suitable billing device so that he will fill in the reading from the meter in a portion of the device which will be left with the customer while other portions of the device will be similarly filled in for the bookkeeping and accounting departments of the utility companies. After the meter reading has been properly recorded, the meter reader will utilize his key to set the device back to zero or the other predetermined setting so that at each reading, the meter will indicate the exact amount used and the charge therefor, while the original meter indicating device will continuously indicate the readings as is usual with such devices.

It will thus be apparent that the present invention provides an attachment by which the reading of the meter may be readily computed into dollars and cents so that not only the meter reader, but the householder may readily ascertain the charges thereon.

For purpose of exemplification, a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

In a conventional meter that has a meter case, a pointer shaft adapted to coact with a dial from which readings of the meter are taken, an attachment to facilitate the reading of the meter, said attachment consisting of a drum that has graduations thereon, a sleeve to which said drum is secured at the center thereof, a stationary axle, said sleeve mounted for rotation on said axle thereby establishing an axis of rotation for said drum, mechanical means drivingly connecting said sleeve with said pointer shaft so that said drum is rotated in response to rotation of said pointer shaft, a housing within which said drum and said mechanical means are mounted, means for mounting said housing on the case of said meter, a graduation inspection window in said housing through which to view the graduations on said drum, said housing having an opening in registry with said sleeve, means accessible through said opening in said housing for resetting said drum, said resetting means including a key receiving notch in said sleeve, a spring reacting on said sleeve and urging said sleeve in one direction parallel to the axis of said axle so that said sleeve is axially slidable on said axle in response to application of a force at said notch, said mechanical means including a gear on said pointer shaft and a gear on said sleeve which are enmeshed with each other so that said gears may be disengaged when said spring is compressed by axially sliding said sleeve on said axle and enabling said sleeve to be rotated on said axle and reset said drum which is fixed to said sleeve.

References Cited in the file of this patent

UNITED STATES PATENTS

| Number | Name | Date |
|---|---|---|
| 353,781 | Deutschbein | Dec. 7, 1886 |
| 964,695 | Rickman | July 19, 1910 |
| 990,125 | Gallagher | Apr. 18, 1911 |
| 1,229,514 | Pierson | June 12, 1917 |
| 1,413,214 | Bassett | Apr. 18, 1922 |
| 1,672,533 | Jurs | June 5, 1928 |
| 2,073,162 | Malcher | Mar. 9, 1937 |
| 2,177,437 | McLaren | Oct. 24, 1939 |

FOREIGN PATENTS

| Number | Country | Date |
|---|---|---|
| 109,856 | Australia | Feb. 16, 1940 |
| 11,385 | Great Britain | May 9, 1891 |